United States Patent [19]

Schaffner et al.

[11] Patent Number: 4,921,283

[45] Date of Patent: May 1, 1990

[54] CONNECTION OF CARBON OR GRAPHITE TUBES

[75] Inventors: Kurt Schaffner, Augsburg; Adolf Swozil, Kühlenthal; Gerhard Ullmann, Gross-Gerau, all of Fed. Rep. of Germany

[73] Assignee: SIGRI GmbH, Meitingen, Fed. Rep. of Germany

[21] Appl. No.: 355,404

[22] Filed: May 22, 1989

[30] Foreign Application Priority Data

May 27, 1988 [DE] Fed. Rep. of Germany ....... 3818067

[51] Int. Cl.$^5$ ............................................. F16L 13/04
[52] U.S. Cl. .................................. 285/114; 285/332; 285/417; 285/423; 285/915
[58] Field of Search ............... 285/915, 423, 397, 417, 285/364, 114, 332

[56] References Cited

U.S. PATENT DOCUMENTS

| | | |
|---|---|---|
| 2,782,806 | 2/1957 | Stambaugh et al. . |
| 2,795,440 | 6/1957 | Holycross et al. . |
| 2,807,282 | 2/1954 | Waits et al. . |
| 3,032,870 | 5/1962 | Rohrberg et al. .............. 285/915 X |
| 3,388,932 | 6/1968 | Bradley .......................... 285/423 X |
| 4,474,233 | 10/1984 | Swozil . |

FOREIGN PATENT DOCUMENTS

| | | |
|---|---|---|
| 1049171 | 1/1959 | Fed. Rep. of Germany . |
| 1053260 | 9/1959 | Fed. Rep. of Germany . |
| 3116309 | 5/1985 | Fed. Rep. of Germany . |

*Primary Examiner*—Dave W. Arola
*Attorney, Agent, or Firm*—Herbert L. Lerner; Laurence A. Greenberg

[57] ABSTRACT

Carbon or graphite tubes which are mutually connected by bonding are less highly stressable than individual tubes. A sleeve formed of fibers is drawn on to the connection location of the tubes. An intermediate section of the sleeve is firmly connected with the tubes. Foils are introduced between end sections of the sleeve and the tubes. The foils are displaceable in the direction of the tube axes. This structure increases the resistance of the connected tubes to stress. The strength reduction factor of the connection is about 10% as compared to the tubes alone.

6 Claims, 1 Drawing Sheet

U.S. Patent
May 1, 1990
4,921,283
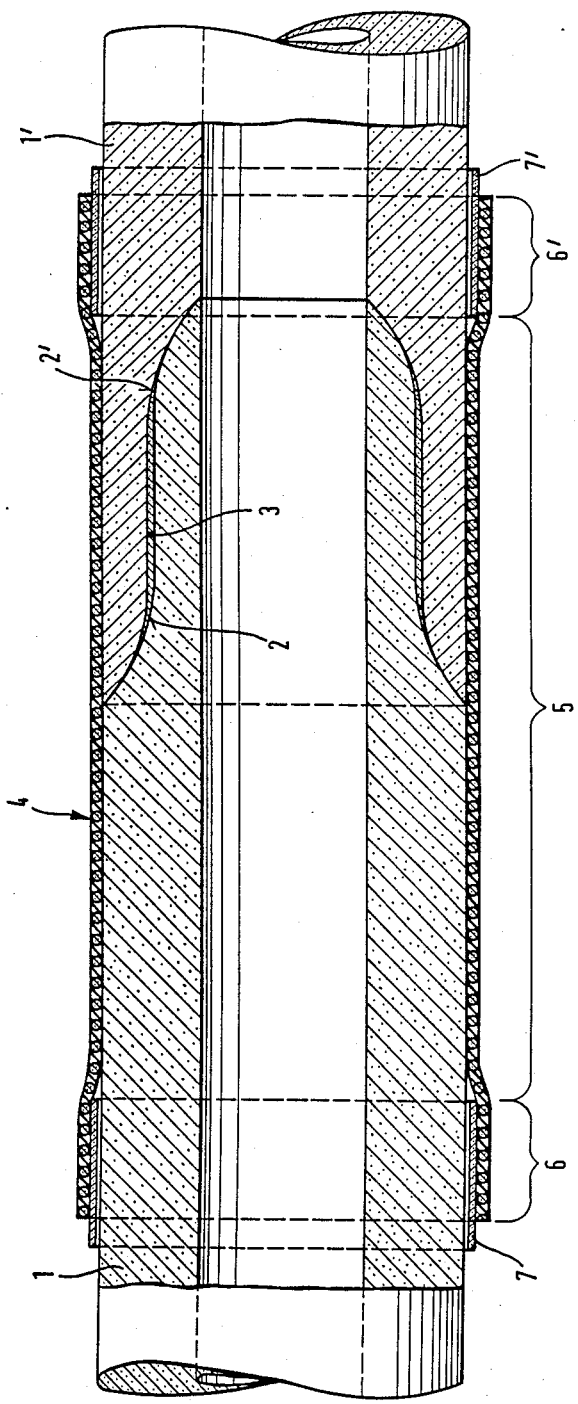

CONNECTION OF CARBON OR GRAPHITE TUBES

The invention relates to an adhesive connection of carbon or graphite tubes by means of a sleeve formed of fibers surrounding the bonding position.

Concerning the connection of tubes and cylinders formed of carbon or graphite, which can only be produced in comparatively short lengths and must be frequently combined into greater lengths for use, it is known to provide the tapered ends with threads and to screw in box couplings which are likewise formed of carbon and graphite. The box coupling connection is less suitable, especially for thin walled tubes, since stress points are formed as a result of the sudden increase of wall thickness at the transition between the tube wall and the box coupling, which necessarily has a greater external diameter than the tube. The strength of the connection is significantly weakened as a result and the reduction factor amounts to 50%.

Carbon or graphite tubes are also connected with one another by adhesive or cement connections. The tube ends are generally tapered or profiled with this type of connection and coated with an adhesive or cement usually containing a hardenable synthetic resin, which is hardened after inserting the tubes together. With merely tapered tubes, an accumulation of the cement along the intersection line of the tapering and the tube jacket when pushing together may not be avoided and there is an undesired variation in the connection strength with a reduction factor that likewise on average amounts to about 50%. A greater and less strongly varying connection strength is obtained with tubes having ends that are profiled in an S-shape, as disclosed in German Patent DE-PS 10 53 260, corresponding to U.S. Pat. No. 2,795,440. The connection, which has a reduction factor that amounts to about 30 to 40%, contains a cement pocket in the mold formed by a surrounding gap. The pocket is bounded by contact lines of the two tubes.

Carbon and graphite are comparatively brittle materials and tubes formed essentially of carbon and graphite are especially sensitive to impact-like stresses. It is known to reinforce carbon and graphite tubes by means of woven fabric sleeves, e.g. formed of glass-fiber mats, as disclosed in German Published, Prosecuted Application DE-AS 10 49 171, corresponding to U.S. Pat. No. 2,807,282, or to wrap the tubes with pretensioned graphite yarn, as disclosed in German Patent DE-PS 31 16 309, corresponding to U.S. Pat. No. 4,474,233 and to connect sleeves and tubes force lockingly by means of synthetic resin bridges. A force-locking connection is one which connects two elements together by force external to the elements, as opposed to a form-locking connection which is provided by the shapes of the elements themselves. Sleeves or wrappings extending over the adhesive or cement positions of tubes which are connected with one another increase the strength of the connection without the breaking strength of the reinforced tubes being reached. A reduction factor of 30 to 50% does not permit the complete use of the tube strength. It is also known to bond the ends of a graphite tube covered with a fabric sleeve by means of a graphite flange, as disclosed in U.S. Pat. No. 2,782,806. The sleeve in that case is embedded directly in the cement layer and although a significant improvement of the bond strength is achieved, one does not achieve the breaking strength of unreinforced tubes.

A common feature of the connections in all of the publications are the large reduction factors which essentially limit the mechanical loading capacity of the connected tubes and indeed limit it to values far below the breaking load of the individual tube.

It is accordingly an object of the invention to provide a connection of carbon or graphite tubes, which overcomes the hereinafore-mentioned disadvantages of the heretofore-known devices of this general type and to improve the strength of the connections so that the connected carbon and graphite tubes can be stressed like the individual tubes.

With the foregoing and other objects in view there is provided, in accordance with the invention, an adhesive connection of carbon or graphite tubes, comprising a sleeve formed of fibers surrounding a given bonding position of two carbon or graphite tubes, the sleeve having an intermediate section firmly connected to the tubes and the sleeve having end sections, and foils disposed between the end sections and the tubes, the foils annularly surrounding the tubes and being displaceable relative to the tubes.

The ends of the tubes to be connected are profiled in a known manner. One end has any desired positive profile while the other has a complementary negative profile. After coating the profiled surfaces with an adhesive or cement, the tube ends are stuck together and the binder contained in the cement is hardened thermally or catalytically. Cement or adhesives are formed of a finely particled or powdered carbon material, e.g. carbon black or graphite, and about 20 to 40% of hardenable resins as a binder. Phenol-aldehyde resins or furan resins, to which hardening catalysts are optionally added, are advantageously used. The plasticity of the adhesive or cement is adjusted by means of the amount of resin in the mixture or even by the addition of plasticizing agents to the respective bonding conditions. The compounds are advantageously heated to about 120° to 180° C. and kept at these temperatures for about 4 to 12 hours for hardening of the resin components. Cements containing catalysts are already hardened as a result of storage at room temperature.

The glued together tube ends are surrounded by a sleeve whose length is preferably greater than the tube diameter. The sleeve is formed of an intermediate section and two end sections which are advantageously symmetrically disposed about the bonding position. The intermediate sleeve section is firmly connected with the tube walls, advantageously by hardened synthetic resin bridges, with the end sections lying on annular foils which are drawn up onto the tubes. The foils which are displaceable with respect to the tube wall form sections of reduced bonding between the sleeve and the tube so that there is no sudden increase in stress built up at the ends of the sleeve. Shearing strains which occur for example as a result of the differential thermal expansion of the sleeve and the tubes give rise to shearing or displacement of the foils at the position of the end sections of the sleeves, as a result of which stress that is disadvantageous to the bonding strength is essentially reduced. The reduction factor for the connection strength amounts therefore only to about 10% so that carbon or graphite tubes connected by the adhesive connection can be stressed like individual tubes, bearing in mind the usual safety margins.

In accordance with another feature of the invention, the length of the sleeve surrounding the tube connection is at least as large and at the most is four times as large as the tube diameter. Should the sleeve extend approximately in the form of a winding over a larger part of the tube length, the foils interrupting the direct contact between sleeve and tube should not be further from the bonding position than approximately the simple tube diameter. With greater separation, the release of stressing of the connection significantly decreases.

The sleeve itself is formed of fibers which have as great a tensile strength and stiffness as possible and withstand the hardening temperatures of the cement and the temperatures of the carbon and graphite tubes during use. Examples are glass fibers, arylamide fibers and above all, in accordance with a further feature of the invention, the sleeve contains carbon fibers which are preferred due to the same corrosive resistance as the tubes.

The sleeves are formed of woven fabrics or webs of these fibers or of yarns which, in accordance with an added feature of the invention, are wrapped onto the tubes. Woven fabrics and yarns are coated with hardenable synthetic resins, such as the same resins which are used for adhesives or cements. Advantageously, the resins of the cement and the coating resin are hardened in one working step. The bridges of hardened resin formed thereby achieve a form locking connection between the intermediate section of sleeve and the mutually bonded tubes.

In accordance with an additional feature of the invention, the sleeve is formed of pre-impregnated textile fabrics (pre-pregs) in which the reinforcing fibers of the sleeve run parallel to the axes of the tubes.

The connections between tubes and the end sections of the sleeves are interrupted, since annularly shaped foils are disposed between the sleeves and the tubes. Foils which are basically suitable for this purpose are temperature and corrosion resistant foils, having a frictional coefficient which is as small as possible or which can be readily deformed by shearing. Examples of the first group are fluorine-containing polymers like polytetrafluoroethylene. An example of the second group which is used in accordance with a concomitant feature of the invention, is graphite foils which behave especially suitably. The foils which are advantageously 0.1 to 0.2 mm thick are laid around the tubes in strips cut with a length corresponding to the tube circumference and a width corresponding to about 1/5 to 1/4 of the sleeve length, at a distance from the connection position of the tubes and fixed by means of the drawn-on sleeves. A connection of greatest strength is therefore not formed between the synthetic resin coated sleeves and the foils since the bonding of the resin to the foils is very slight and essentially worse than the bonding of the resin to the wall surfaces of the tubes.

Other features which are considered as characteristic for the invention are set forth in the appended claims.

Although the invention is illustrated and described herein as embodied in a connection of carbon or graphite tubes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

The drawing is a fragmentary, diagrammatic, partly broken-away and sectional view of graphite tubes through which the invention will be explained by means of an example.

Referring now in detail to the single FIGURE of the drawing, there are seen graphite tubes 1, 1' with S-shape profiled end surfaces 2, 2'. A gap formed between the end surfaces is filled with cement material 3 which is formed of a mixture containing a phenolformaldehyde resin, carbon black and graphite powder. A synthetic resin coated sleeve or collar 4 which contains an intermediate section 5 and end sections 6, 6' is applied over the connection location of the tubes. The tubes have an outside diameter of 37 mm and an inside diameter of 25 mm. Upon hardening of the synthetic resin coating, a very strong connection between the intermediate section 5 of the sleeve and the tubes 1, 1' occurs through synthetic resin bridges. Annularly shaped graphite foils 7, 7' with a thickness of 0.2 mm are inserted between the end sections 6, 6' of the sleeve and the tubes 1, 1'. The foils prevent adhering between sleeve and the tubes in this region. The sleeve is formed of graphite fiber yarn with a tensile strength of about 3 GPa.

In order to check the strength of the connection, the connected tubes were subjected to bending (in a four point bending test), as shown below for Sample (C). For comparison, the strength at breaking of graphite tubes was measured in Sample (A) and the strength at breaking of adhered tubes without a sleeve was measured in Sample (B).

| Sample | Strength at break MPa | Reduction factor % |
| --- | --- | --- |
| A | 45 | — |
| B | 29 | 35 |
| C | 41 | 10 |

The foregoing is a description corresponding in substance to German Application P 38 18 067.7, dated May 27, 1988, the International priority of which is being claimed for the instant application, and which is hereby made part of this application. Any material discrepancies between the foregoing specification and the aforementioned corresponding German application are to be resolved in favor of the latter.

We claim:

1. Adhesive connection of carbon or graphite tubes, comprising carbon or graphite tubes having ends joined together in a given bonding position by bonding material positioned between the tube ends and a sleeve formed of fibers surrounding the given bonding position of the two carbon or graphite tubes, said sleeve having an intermediate section firmly connected to the tubes by cement and said sleeve having end sections, and enveloping foils disposed between said end sections and the tubes, said foils annularly surrounding the tubes, and said foils being glued to said end sections and being displaceable relative to the tubes.

2. Adhesive connection according to claim 1, wherein the length of said sleeve is greater than the diameter of the tubes and is at most four times the diameter of the tubes.

3. Adhesive connection according to claim 1, wherein said sleeve contains carbon fibers.

4. Adhesive connection according to claim 1, wherein said sleeve is wrapped around the tubes.

5. Adhesive connection according to claim 1, wherein said sleeve is formed of a textile fabric having reinforcing fibers oriented parallel to the axis of the tubes.

6. Adhesive connection according to claim 1, wherein said foils annularly surrounding the tubes are graphite foils.

* * * * *